March 8, 1966 E. MATOVICH 3,239,731

SELF-HEALING THIN-FILM CAPACITOR

Filed April 21, 1964

INVENTOR.
EDWIN MATOVICH,
BY John M. Koch
ATTORNEY.

United States Patent Office 3,239,731

Patented Mar. 8, 1966

3,239,731

SELF-HEALING THIN-FILM CAPACITOR

Edwin Matovich, Costa Mesa, Calif., assignor to Hughes Aircraft Company, Culver City, Calif., a corporation of Delaware Filed Apr. 21, 1964, Ser. No. 361,516
3 Claims. (Cl. 317—258)

This invention relates to a thin-film capacitor and particularly such a capacitor which will itself heal pin holes in the dielectric layer between the two capacitor plates, or electrodes.

Thin-film capacitors generally are formed by first vapor-depositing a thin film of conductor upon a suitable substrate, then a film of dielectric material is superimposed upon the film of conductor and finally another film of conductor is vapor-deposited over the film of dielectric material to complete the capacitor structure. In actual practice it is difficult to form a uniform, continuous film of dielectric material between the two conductor films. Pin holes often form in the dielectric film before the second conductor film is deposited thereover. Upon vapor-depositing the second conductor film over the dielectric film, conductor material enters the pin holes in the dielectric film. When an electric charge is applied to the resulting capacitor short circuits develop at the conductor-containing pin holes between the two films of conductor.

Accordingly, it is a principal object of this invention to provide a thin-film capacitor which itself heals short circuits resulting from pin holes in the dielectric film.

Additional objects will become apparent from the following description of the invention, which is given primarily for purposes of illustration, and not limitation.

Stated in general terms, the objects of the invention are attained by providing a thin-film capacitor in which the conductor films and the dielectric films are so chosen that the conductor material, which enters the pin holes in the dielectric film, is converted into a dielectric upon the application of an electric charge to the capacitor, to thus heal the pin holes by sealing them with dielectric and eliminating short circuits which otherwise would occur at the conductor-filled pin holes.

Figure 1:
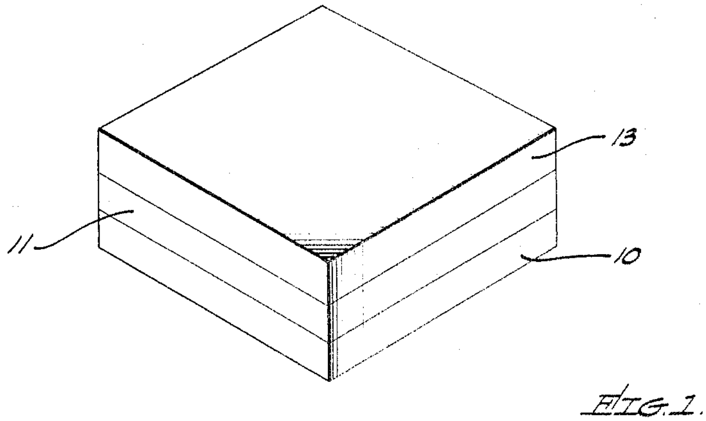
Figure 2:
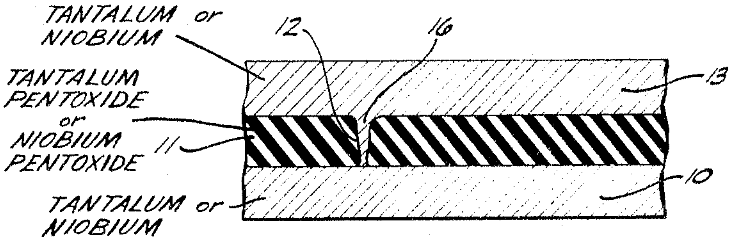
Figure 3:
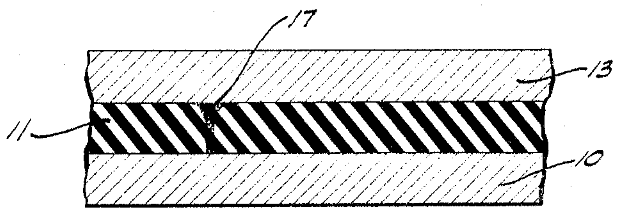

A more detailed description of specific embodiments of the invention is given below with reference to the accompanying drawing, wherein:

FIG. 1 is an isometric view drawn to a greatly enlarged scale showing a thin-film capacitor made in accordance with the method of the invention;

FIG. 2 is a vertical cross-sectional view drawn to a greatly enlarged scale taken through a capacitor structure such as that of FIG. 1 showing a pin hole in the dielectric layer partially filled with conductor layer material before it is converted to dielectric material; and FIG. 3 is a view similar to that of FIG. 2 showing the pin hole after the conductor material therein has been converted to dielectric material.

In a vapor-deposition chamber or reaction tube, the thin-film capacitor structure shown in FIG. 1 is formed as follows. A film of tantalum conductor 10 is vapor-deposited upon a ceramic substrate (not shown) by hydrogen reduction of tantalum pentachloride vapor, for example at a temperature in the range from about 550° to about 800° C., by a method well known by persons skilled in the art. This may be done with the aid of a suitable mask. Other methods of depositing a thin film 10 of tantalum upon the substrate can, of course, be used. The resulting thin film of tantalum 10 may then be annealed at, for example, about 250° to about 400° C., in vacuum to remove therefrom embrittling hydrogen by the use of a conventional method.

The resulting thin film of tantalum 10 then is provided with a covering film 11 of suitable dielectric material, such as tantalum pentoxide. Dielectric film 11 can be produced by thermally oxidizing the exposed surface of tantalum film 10 in an atmosphere of dry oxygen at a temperature in the range from about 150° to about 300° C., by conventional means. In this case a portion of the thickness of tantalum film 10 is lessened to form the thickness of dielectric film 11. This is not shown in the drawing to avoid complicating the same. The resulting dielectric film 11 of tantalum pentoxide generally is penetrated by a group of pin holes of small cross-sectional area, such as pin hole 12 shown greatly enlarged in FIG. 2.

Finally a second film of tantalum 13 is deposited over dielectric film 11 by the use of any suitable method which will not remove or damage the dielectric film. This can be done by conducting a tantalum pentachloride vapor phase reduction with hydrogen as described hereinabove in vapor-depositing tantalum film 10 upon a ceramic substrate. In such case tantalum film 13 also is annealed as described above in discussing tantalum film 10. While depositing tantalum film 13, pin hole 12 is partially filled with a projection of tantalum metal 16 as shown in FIG. 2.

Upon placing a charge upon the capacitor having the structure shown in FIGS. 1 and 2, including pin holes such as 12 filled with tantalum metal such as 16, a disproportionation reaction takes place between the tantalum metal 16 and the tantalum pentoxide dielectric 11 to convert all of the tantalum metal 16 at the interface to a lower tantalum oxide dielectric 17 as shown in FIG. 3. Thus any pin holes 12, 16, or hot spots, causing short circuits in the capacitor are healed by being sealed by, or converted to a dielectric lower oxide of tantalum 17 which may be tantalum trioxide to produce a highly reliable, long service life thin-film capacitor.

Similarly, a self-healing, thin-film niobium capacitor is made by substituting niobium for tantalum in the two outer conductor deposited films 10 and 13 in FIGS. 1 to 3 and niobium pentoxide for tantalum pentoxide in the inner dielectric deposited or formed film 11 in FIGS. 1 to 3. In this case, the niobium metal 16 in pin hole 12, upon charging the capacitor, reacts by disporportionation with the surrounding niobium pentoxide 11 to seal and self heal the pin hole 12 by converting the niobium conductor 16 to a lower oxide of niobium dielectric 17 which may be niobium trioxide. The process steps and reactions given above in connection with the use of tantalum and tantalum pentoxide are very similar for the use of niobium and niobium pentoxide because of the similarity of physical and chemical properties of tantalum and niobium.

Obviously many other modifications and variations of the present invention are possible in the light of the above teachings. It is therefore to be understood that within the scope of the appended claims, the invention can be practiced otherwise than as specifically described.

What is claimed is:

1. A thin-film capacitor comprising a pair of juxtaposed thin-film conductors made of the same metal selected from the group consisting of tantalum and niobium metals, and a thin-film dielectric intermediate the pair of thin-film conductors made of a pentoxide of the metal forming said pair of conductors.

2. A thin-film capacitor comprising a pair of juxtaposed thin-film conductors made of tantalum metal and a thin-film dielectric intermediate the pair of thin-film conductors made of tantalum pentoxide dielectric.

3. A thin-film capacitor comprising a pair of juxtaposed thin-film conductors made of niobium metal, and a thin-film dielectric intermediate the pair of thin-film conductors made of niobium pentoxide dielectric.

References Cited by the Examiner

UNITED STATES PATENTS 2,993,266 7/1961 Berry.

ROBERT K. SCHAEFER, *Primary Examiner.*

JOHN F. BURNS, *Examiner.*

D. J. BADER, *Assistant Examiner.*